(12) United States Patent
Kang

(10) Patent No.: US 12,517,824 B2
(45) Date of Patent: Jan. 6, 2026

(54) MEMORY CONTROLLER PERFORMING MAP INFORMATION MANAGEMENT

(71) Applicant: SK hynix Inc., Gyeonggi-do (KR)

(72) Inventor: Hye Mi Kang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 22 days.

(21) Appl. No.: 18/327,055

(22) Filed: Jun. 1, 2023

(65) Prior Publication Data

US 2024/0211394 A1 Jun. 27, 2024

(30) Foreign Application Priority Data

Dec. 23, 2022 (KR) .................. 10-2022-0183410

(51) Int. Cl.
*G06F 12/02* (2006.01)

(52) U.S. Cl.
CPC ........ *G06F 12/0292* (2013.01); *G06F 12/023* (2013.01)

(58) Field of Classification Search
CPC ............... G06F 12/0292; G06F 12/023; G06F 12/0246; G06F 2212/7201; G06F 2212/7208; G06F 2212/7207; G06F 3/0604; G06F 3/0658; G06F 3/0659
See application file for complete search history.

(56) References Cited

U.S. PATENT DOCUMENTS

| | | | |
|---|---|---|---|
| 2017/0262173 A1* | 9/2017 | Song | G06F 12/0246 |
| 2019/0196963 A1* | 6/2019 | Byun | G06F 12/0246 |
| 2020/0201573 A1* | 6/2020 | Kwak | G06F 3/0604 |
| 2020/0226072 A1* | 7/2020 | Kang | G06F 12/10 |
| 2020/0233796 A1* | 7/2020 | Kim | G06F 12/123 |
| 2020/0327064 A1* | 10/2020 | Kang | G06F 13/1668 |
| 2020/0327070 A1* | 10/2020 | Byun | G06F 12/126 |
| 2021/0026777 A1* | 1/2021 | Byun | G06F 9/54 |
| 2021/0064293 A1* | 3/2021 | Cho | G06F 3/0673 |
| 2021/0278993 A1* | 9/2021 | You | G06F 3/0655 |
| 2022/0004489 A1 | 1/2022 | Cariello | |

FOREIGN PATENT DOCUMENTS

| | | |
|---|---|---|
| KR | 10-2017-0000914 A | 1/2017 |
| KR | 10-2021-0011216 A | 2/2021 |

* cited by examiner

*Primary Examiner* — Khoa D Doan
*Assistant Examiner* — Julian S Mendel
(74) *Attorney, Agent, or Firm* — IP & T GROUP LLP

(57) ABSTRACT

A memory system comprises a memory device configured to store data; and a memory controller configured to: classify and store access data for plural pieces of map information respectively, according to a cycle; assign different weights to plural pieces of access data, classified according to the cycle, to determine a priority of the plural pieces of map information; and transmit at least one map information to a host based on the priority.

15 Claims, 12 Drawing Sheets

(A) BIT

OR (B) COUNT (A)

(B)

MEMORY CONTROLLER PERFORMING MAP INFORMATION MANAGEMENT

CROSS-REFERENCE TO RELATED APPLICATION

This application claims priority under 35 U.S.C. § 119 to Korean Patent Application No. 10-2022-0183410 filed on Dec. 23, 2022, which is incorporated herein by reference in its entirety.

BACKGROUND

1. Field

Various embodiments of the present disclosure relate to map information management and, more particularly, to a memory controller that manages hot map information.

2. Discussion of the Related Art

A memory system includes a memory controller and a memory device. The memory device stores data and the memory controller controls operations of the memory device. In the memory system, a volatile memory device and a non-volatile memory device may be used. The volatile memory device is used to temporarily store data, and the non-volatile memory device is used to permanently store data.

As the amount of data communication between a memory device and a host such as a computer, a smartphone, a smart pad, and the like increases, the access operation speed of the memory controller becomes increasingly important. As a result, there is a growing need for the memory controller with improved access operation speed.

SUMMARY

Various embodiments of the present disclosure are directed to a memory controller with improved access operation speed.

Further, various embodiments of the present disclosure are directed to a memory controller capable of managing hot map information that has recently been frequently accessed by a host.

Technical problems to be resolved by the present disclosure are not limited to the aforementioned technical problems and other unmentioned technical problems will be clearly understood by those skilled in the art from the following description.

Various embodiments of the present disclosure are directed to providing a memory device, a memory system, a controller included in the memory system, or a data processing system including the memory system.

In an embodiment of the present disclosure, a memory system comprises: a memory device configured to store data; and a memory controller configured to: classify and store access data for plural pieces of map information respectively, according to a cycle; assign different weights to plural pieces of access data, classified according to the cycle, to determine a priority of the plural pieces of map information; and transmit at least one map information to a host based on the priority.

The memory controller is configured to: select at least one target map information in which accumulation data of the plural pieces of access data is greater than or equal to a threshold value, among the plural pieces of map information, and assign the different weights to the plural pieces of access data corresponding to the target map information according to the cycle.

The memory controller is configured to determine the priority of the target map information according to weighted accumulation data calculated by accumulating the weighted plural pieces of access data corresponding to the target map information.

In an embodiment of the present disclosure a memory controller comprises: a plurality of memory regions configured to include the Nth memory region for storing Nth access data for plural pieces of map information, corresponding to the Nth cycle, where N is a natural number; a flash translation layer configured to select at least one target map information in which accumulation data of plural pieces of access data stored in the plurality of memory regions is greater than or equal to a threshold value, among the plural pieces of map information, and assign different weights to the plural pieces of access data corresponding to the target map information, to determine a priority of the target map information when the Nth cycle is completed; and a host interface configured to transmit the target map information to a host based on the priority.

The different weights may have a value based on a cycle.

The flash translation layer is configured to assign a first weight to the Nth access data, and a second weight lower than the first weight to the N−1th access data corresponding to the N−1th cycle which is a previous cycle of the Nth cycle.

The flash translation layer is configured to determine the priority of the target map information according to weighted accumulation data calculated by accumulating the weighted plural pieces of access data corresponding to the target map information.

The flash translation layer is configured to re-determine the priority of the target map information having a same priority based on a read count for the plural pieces of map information, the read count is a cumulative number of access requests received from the host since power was supplied to the memory controller.

Aspects of the present disclosure are merely some embodiments of the present disclosure. Various embodiments into which technical characteristics of the present disclosure have been incorporated may be derived and understood based on the detailed description of the present disclosure by a person having ordinary knowledge in the art.

In accordance with an embodiment of the present disclosure, the memory system can manage access data related to access requests received from an external host separately, based on the reception cycle of the access request. This allows for the efficient identification of frequently accessed hot map information by the host.

Moreover, in line with an embodiment of the present disclosure, the memory system can send map information, which has been consistently requested by the host over several recent cycles, back to the host while also receiving access requests that include map information from the host. This approach helps prevent the memory controller's performance from degrading and enhances utilization efficiency, resulting in faster processing of access operations.

Effects of the present disclosure which may be obtained in the present disclosure are not limited to the aforementioned effects, and other effects not described above may be evidently understood by a person having ordinary knowledge in the art to which the present disclosure pertains from the following description.

DETAILED DESCRIPTION

Hereinafter, various embodiments of the present disclosure will be described in detail with reference to the accompanying drawings. In the following description, it is to be noted that only a part necessary to understand an operation according to an embodiment of the present disclosure is described and descriptions of the other parts will be omitted in order not to obscure the subject matter of the present disclosure.

In the following, embodiments of the present invention will be described with reference to the accompanying drawings in order to describe the technical ideas of the present invention in sufficient detail to enable one having ordinary skill in the technical field to which the present invention belongs to practice it with ease.

Figure 1:
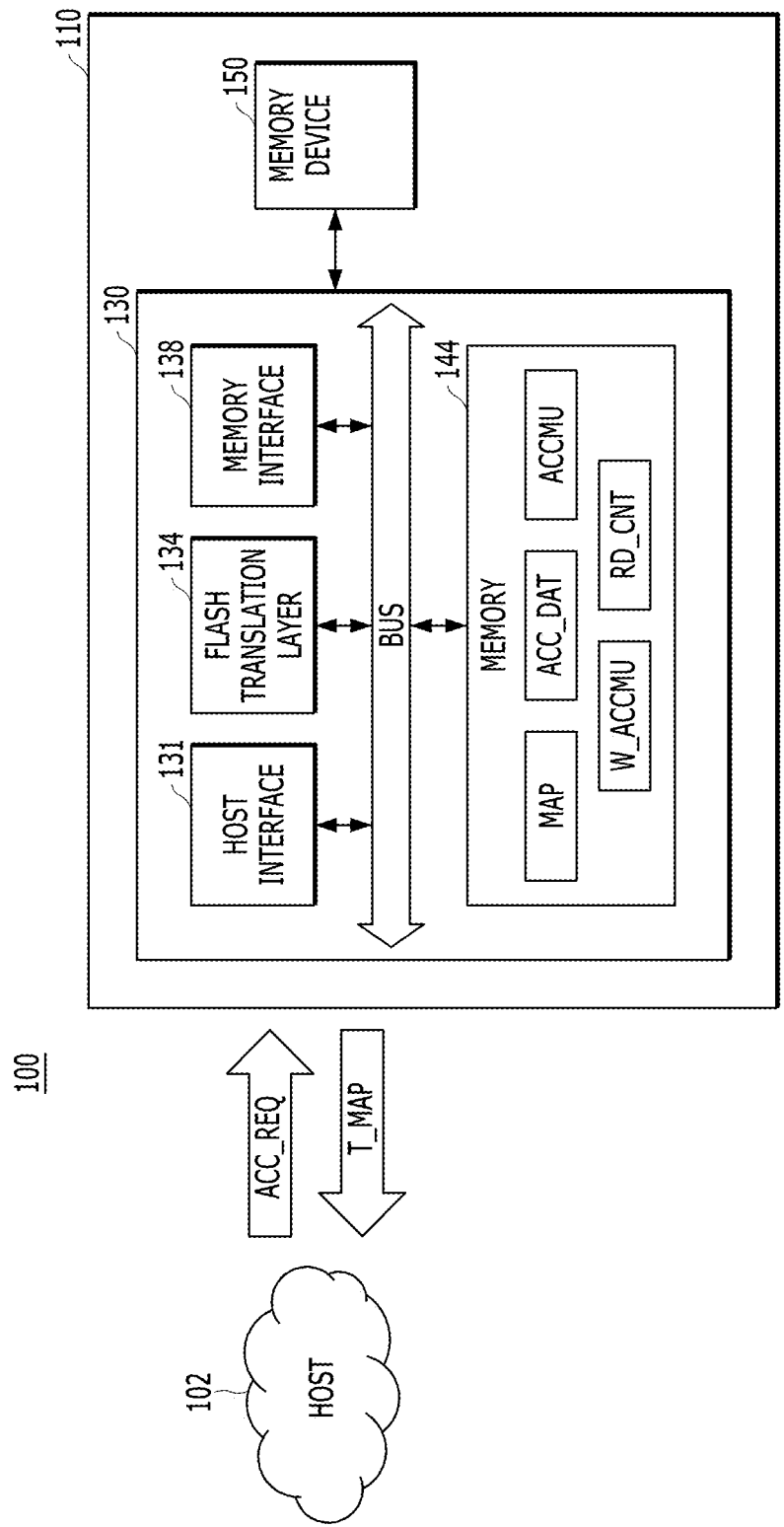
FIG. 1 is a block diagram illustrating a data processing system that includes a host and a memory system according to an embodiment of the present disclosure.

FIG. 1 is a block diagram illustrating a data processing system 100 that includes a host 102 and a memory system 110 according to an embodiment of the present disclosure.

The data processing system 100 may include the host 102 and the memory system 110.

The host 102 may transmit an access request ACC_REQ along with a logical address to the memory system 110.

The memory system 110 may receive the access request ACC_REQ from the host 102. The memory system 110 may transmit to the host 102 target map information T_MAP that has been recently and frequently accessed by the host 102 among a plurality of map information MAP.

The memory system 110 may include a memory device 150 and a memory controller 130 for controlling the memory device 150.

The memory device 150 may perform a write operation, a read operation, and an erase operation under control of the memory controller 130.

The memory controller 130 may generate the map information MAP by mapping the logical address received from the host 102 to a physical address of the memory device 150. The memory controller 130 may perform a logical-to-physical (L2P) translation operation that translates the logical address received from the host 102 into the physical address, using the map information MAP. The memory controller 130 may read user data from the memory device 150 based on the translated physical address and transmit the read user data to the host 102.

In accordance with an embodiment of the present disclosure, the memory controller 130 may not perform the L2P translation operation if the received access request ACC_REQ from the host 102 includes a physical address from the host 102. Since the memory controller 130 may not perform the L2P translation operation, a performance and utilization efficiency of the memory controller 130 can be improved, and an access operation of the memory controller 130 can be processed faster.

The memory controller 130 may include a host interface 131, a flash translation layer (FTL) 134, a memory interface 138, and a memory 144. The host interface 131, the memory interface 138, the memory 144, and the flash translation layer 134 may communicate control signals and data with each other through a bus BUS.

The host interface 131 may transmit the access request ACC_REQ received from the host 102 to the flash translation layer 134.

The memory interface 138 may communication data with the memory device 150.

The memory 144 may store system information used in the memory controller 130. For example, the memory 144 may serve as a working memory, a cache memory, or a buffer memory for the memory controller 130. The memory 144 may include at least one of volatile memory cells and non-volatile memory cells.

In accordance with an embodiment of the present disclosure, the memory 144 may store metadata required for the operation of the flash translation layer 134. The metadata may include the map information MAP, access data ACC_DAT, accumulation data ACCMU, weighted accumulation data W_ACCMU, and a read count RD_CNT.

The map information MAP may include a plurality of L2P maps comprising logical addresses and their corresponding physical addresses. The map information MAP includes inactive map information and dirty map information. The inactive map information is map information that is not stored in the host 102. The dirty map information is map information in which the physical address has been changed included in active map information stored in the host 102.

The access data ACC_DAT may indicate whether an access request ACC_REQ for a logical address is received during a preset cycle. In addition, the access data ACC_DAT may indicate the number of the access requests ACC_REQ corresponding to the logical address received during a cycle. The access data ACC_DAT may be managed corresponding to the map information MAP including the logical address. According to an embodiment of the present disclosure, the access data ACC_DAT may have a data structure classified according to a plurality of cycles.

The memory 144 may include a plurality of memory regions for storing a plurality of access data ACC_DAT classified by the plurality of cycles.

For example, the memory 144 may store the Nth access data for the plurality of map information MAP corresponding to the Nth cycle in a memory region. The memory region may correspond to the Nth cycle.

The accumulation data ACCMU may be calculated by accumulating the plurality of access data ACC_DAT classified by the plurality of cycles.

The weighted accumulation data W_ACCMU may be calculated by accumulating a weighted access data ACC_DAT to which a weight based on the cycle is assigned.

The read count RD_CNT may include the cumulative number of access requests ACC_REQ received from the host 102 since power was supplied to the memory controller 130.

The accumulation data ACCMU, the access data ACC_DAT, the accumulation data ACCMU, the weighted accumulation data W_ACCMU, and the read count RD_CNT may be managed according to the logical address of the map information MAP.

The flash translation layer may translate a logical address received from the host 102 into a physical address. The flash translation layer 134 may classify and manage the access data ACC_DAT for the map information MAP based on the cycle in which the access request ACC_REQ is received.

In addition, the flash translation layer 134 may assign the highest weight to the access data ACC_DAT corresponding to the most recent cycle among the plurality of access data ACC_DAT. For example, the flash translation layer 134 may assign the first weight to the Nth access data. The flash translation layer 134 may assign the second weight, which is lower than the first weight, to the N−1th access data. The Nth access data corresponds to the Nth cycle, and the N−1th access data corresponds to the N−1th cycle. The N−1th cycle is the previous cycle of the Nth cycle.

The flash translation layer 134 may determine target map information T_MAP based on the access data ACC_DAT. The flash translation layer 134 may determine a priority of the target map information T_MAP based on the weighted accumulation data W_ACCMU.

The flash translation layer 134 may transmit the target map information T_MAP to the host 102 through the host interface 131 based on the priority. As a result, since the memory controller 130 receives the access request ACC_REQ accompanied by the physical address from the host 102, an access operation can be quickly performed without the L2P translation operation.

Figure 2:
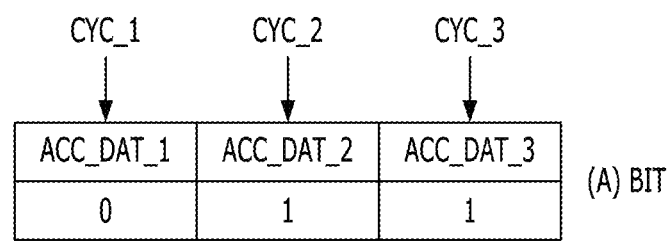
FIG. 2 is a block diagram illustrating a data structure of an access data according to an embodiment of the present disclosure.
Figure 2:
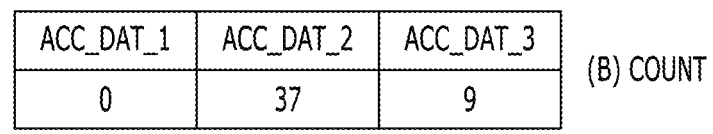

FIG. 2 is a block diagram illustrating a data structure of access data according to an embodiment of the present disclosure.

As shown in FIG. 2, the data structure of access data ACC_DAT may be classified according to a plurality of cycles CYC_1, CYC_2, or CYC_3. In this case, the time corresponding to a cycle may be set based on a real-time clock(RTC) of the host 102 or an internal clock of the memory controller 130.

The memory controller 130 may store the access data ACC_DAT based on the access request ACC_REQ received from the host 102 during the cycle whenever the cycle is completed.

For example, the first access data ACC_DAT_1 may indicate whether the logical addresses included in first map information MAP_1 were requested for access by the host 102 during the first cycle CYC_1, or the number of access requests for the logical addresses included in the first map information MAP_1 during the first cycle CYC_1.

The second access data ACC_DAT_2 may indicate whether logical addresses included in the first map information MAP_1 have been requested for access by the host 102 during the second cycle CYC_2, or the number of access requests for the logical addresses included in the first map information MAP_1 during the second cycle CYC_2.

The third access data ACC_DAT_3 may indicate whether the host 102 requested access to logical addresses included in the first map information MAP_1 during the third cycle CYC_2, or the number of access requests to the logical addresses included in the first map information MAP_1 during the third cycle CYC_3.

Therefore, the memory controller 130 may determine whether the plurality of map information MAP is accessed for each cycle, and the number of accesses for each cycle, using the first to the third access data ACC_DAT_1, ACC_DAT_2, and ACC_DAT_3.

In addition, the memory controller 130 may determine hot map information frequently requested for access and cold map information infrequently requested for access for each cycle by referring to the access data ACC_DAT stored in different memory regions for each cycle, on a cycle-by-cycle basis.

As shown in (A) of FIG. 2, when the access data ACC_DAT is represented as bit data BIT, the access data ACC_DAT may indicate whether the map information is requested for access. Accordingly, the memory controller 130 may determine which map information is requested for access by the host 102 on a cycle-by-cycle basis using the low-capacity bit data BIT.

Also, as shown in (B) of FIG. 2, when the access data ACC_DAT is represented as count data COUNT, the access data ACC_DAT may indicate the number of access requests for the map information. Accordingly, the memory controller 130 may determine which map information is accessed and how often by the host 102 for each cycle during a cycle.

Figure 3:
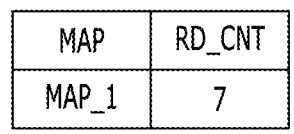
FIG. 3 is a block diagram illustrating a data structure of a read count according to an embodiment of the present disclosure.

FIG. 3 is a block diagram illustrating a data structure of a read count according to an embodiment of the present disclosure. The read count RD_CNT may include the cumulative number of access requests ACC_REQ received from the host 102 since power was supplied to the memory controller 130.

Figure 4A:
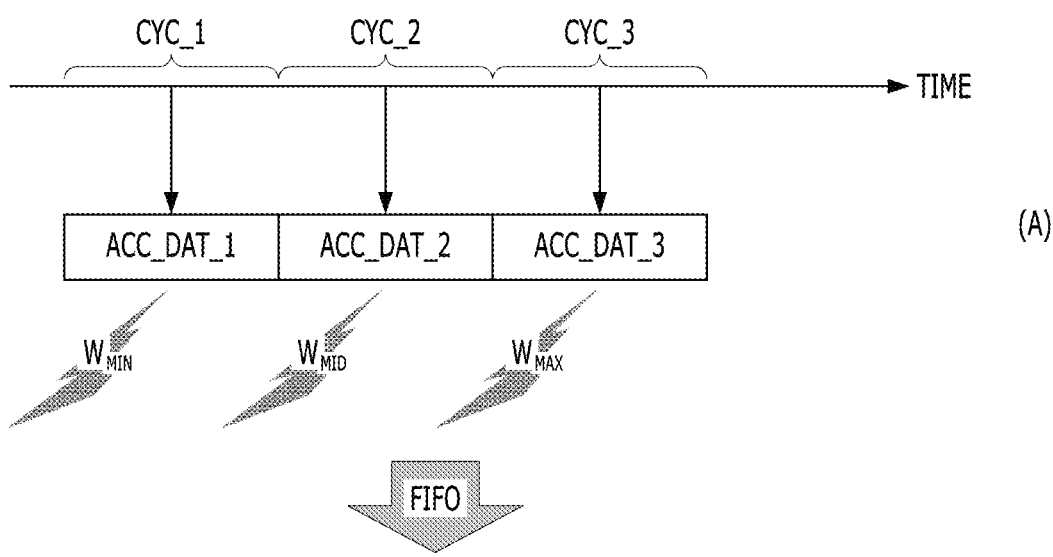
FIG. 4A and FIG. 4B are diagrams illustrating an access data management operation according to an embodiment of the present disclosure.
Figure 4A:
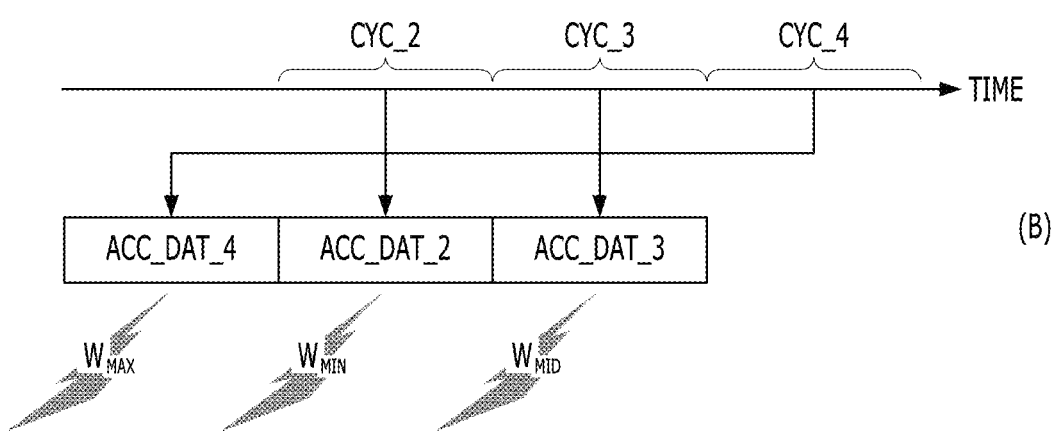
Figure 4B:
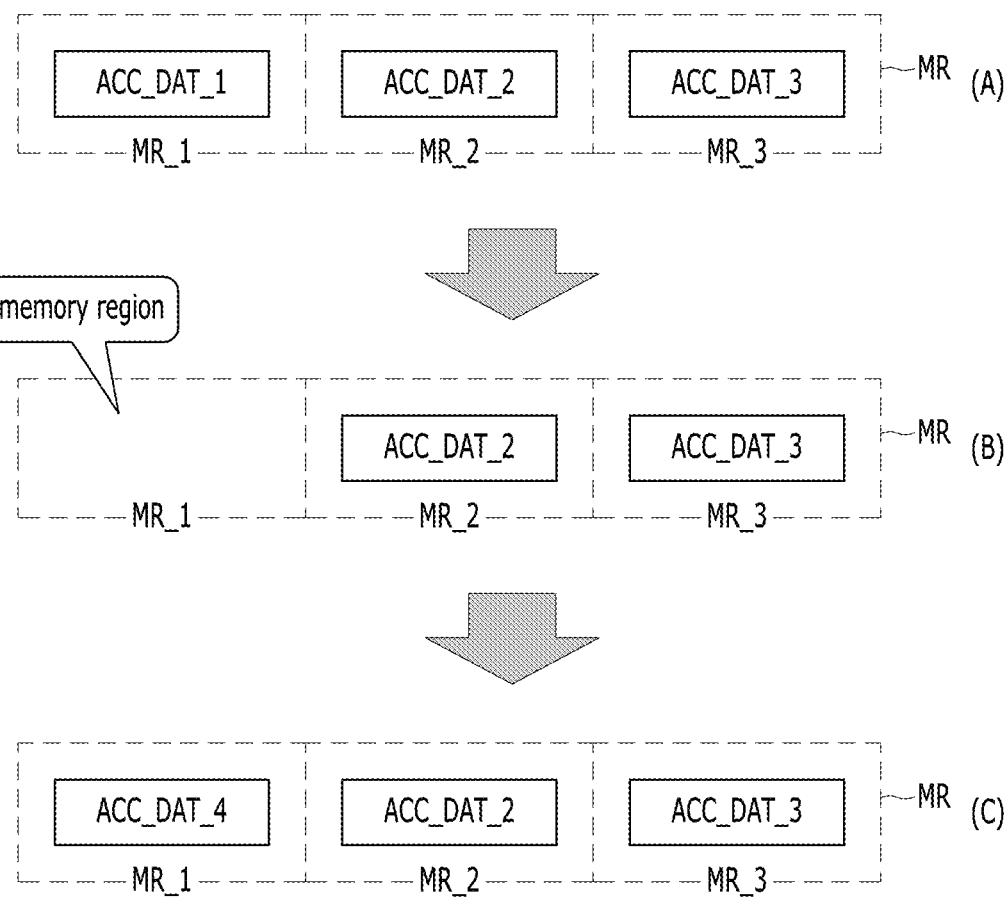

FIG. 4A and FIG. 4B are diagrams illustrating an access data management operation according to an embodiment of the present disclosure.

FIG. 4A illustrates an example of the access data ACC_DAT having a data structure that is first-in-first-out (FIFO). FIG. 4B illustrates an example of the memory regions MR in which the data structure of the access data ACC_DAT is stored.

Hereinafter, with reference to FIG. 4A and FIG. 4B, the access data management operation which can save resources in the data structure and the memory region with limited capacity is described.

As shown in (A) of FIG. 4A, the access data ACC_DAT may include the data structure classified according to a plurality of cycles CYC_1, CYC_2, and CYC_3.

The access data ACC_DAT may include the first access data ACC_DAT_1 corresponding to the first cycle CYC_1, the second access data ACC_DAT_2 corresponding to the second cycle CYC_2, and the third access data ACC_DAT_3 corresponding to the third cycle CYC_3. The data structure of the access data ACC_DAT is full of the first to third access data ACC_DAT_1 to ACC_DAT_3.

In addition, the memory controller 130 may assign a maximum weight WMAX to the third access data ACC_DAT_3 corresponding to the third cycle CYC_3, the most recent cycle. The memory controller 130 may assign a medium weight WMID to the second access data ACC_DAT_2. The memory controller 130 may assign a minimum weight WMIN to the first access data ACC_DAT_1.

The size of the data structure of the access data ACC_DAT is limited. Accordingly, in accordance with another embodiment of the present disclosure, the access data ACC_DAT may be formed as a data structure, i.e., first-in-first-out (FIFO).

As shown in (B) of FIG. 4A, the memory controller 130 may erase the first access data ACC_DAT_1 corresponding to the first cycle CYC_1 and then store the fourth access data ACC_DAT_4 corresponding to the fourth cycle CYC_4.

At this time, after storing the fourth access data ACC_DAT_4, the memory controller 130 assigns the maximum weight WMAX to the fourth access data ACC_DAT_4 corresponding to the fourth cycle CYC_4, which is the most recent cycle, a medium weight WMID to the third access data ACC_DAT_3, and a minimum weight WMIN to the second access data ACC_DAT_2.

The memory region MR shown in FIG. 4B is for storing the data structure of the access data ACC_DAT. The memory region MR may be a part of the memory 144 described in FIG. 1 or may be located outside the memory controller 130.

The memory region MR may be divided into a plurality of memory regions MR_1, MR_2, and MR_3 to store the access data ACC_DAT of the plurality of map information MAP in different regions for each cycle. Each of the plurality of cycles may correspond to the different memory regions MR_1, MR_2, or MR_3.

As shown in (A) of FIG. 4B, the memory controller 130 stores the first access data ACC_DAT_1 in the first memory region MR_1, the second access data ACC_DAT_2 in the second memory region MR_2, and the third access data ACC_DAT_3 in the third memory region MR_3.

As described above, the memory controller 130 determines whether the plurality of map information MAP is accessed and the number of accesses for each cycle using the classified first to third access data ACC_DAT_1, ACC_DAT_2, and ACC_DAT_3 stored in different memory regions MR_1, MR_2, or MR_3 divided according to the cycle.

As shown in part B of FIG. 4B, if the storage space of the memory region MR is insufficient after the third access data ACC_DAT_3 is stored, the memory controller 130 may turn the first memory region MR_1 into a free memory region by erasing the first access data ACC_DAT_1 corresponding to the first cycle CYC_1. The memory controller 130 may also store the fourth access data corresponding to the fourth cycle CYC_4 in the first memory region MR_1, which is the free memory region.

As described above, the memory controller 130 may manage the access data ACC_DAT in a first-in-first-out (FIFO) manner by controlling the plurality of memory regions MR_1, MR_2, and MR_3.

Figure 5:
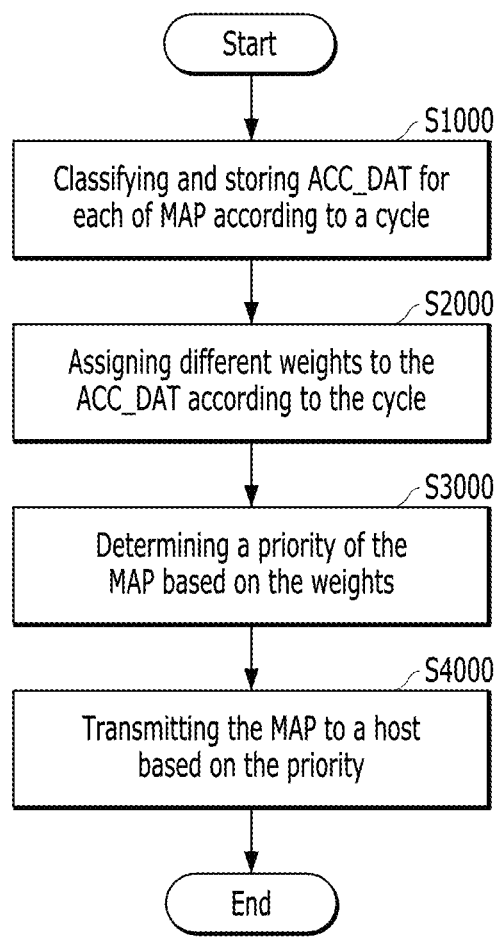
FIG. 5 is a flowchart for describing an operation of according to an embodiment of the present disclosure.

FIG. 5 is a flowchart for describing an operation of according to an embodiment of the present disclosure.

Operation of the memory controller 130 is described below with reference to FIG. 1 to FIG. 5.

In operation S1000, the memory controller 130 may perform an access data management operation by classifying and storing the access data ACC_DAT for each of the map information MAP according to a cycle.

In operation S2000, the memory controller 130 may perform a weight assignment operation by assigning different weights to the plurality of access data according to the cycles.

In operation S3000, the memory controller 130 may perform a priority determination operation by determining priorities for the map information MAP based on the first to third access data ACC_DAT_1 to ACC_DAT_3 to which weights are assigned.

In operation S4000, the memory controller 130 may transmit a portion of the map information MAP to the host 102 based on the determined priority.

Thereafter, the memory controller 130 may erase the map information MAP transmitted to the host 102 and the associated access data ACC_DAT from the memory 144.

Figure 6:
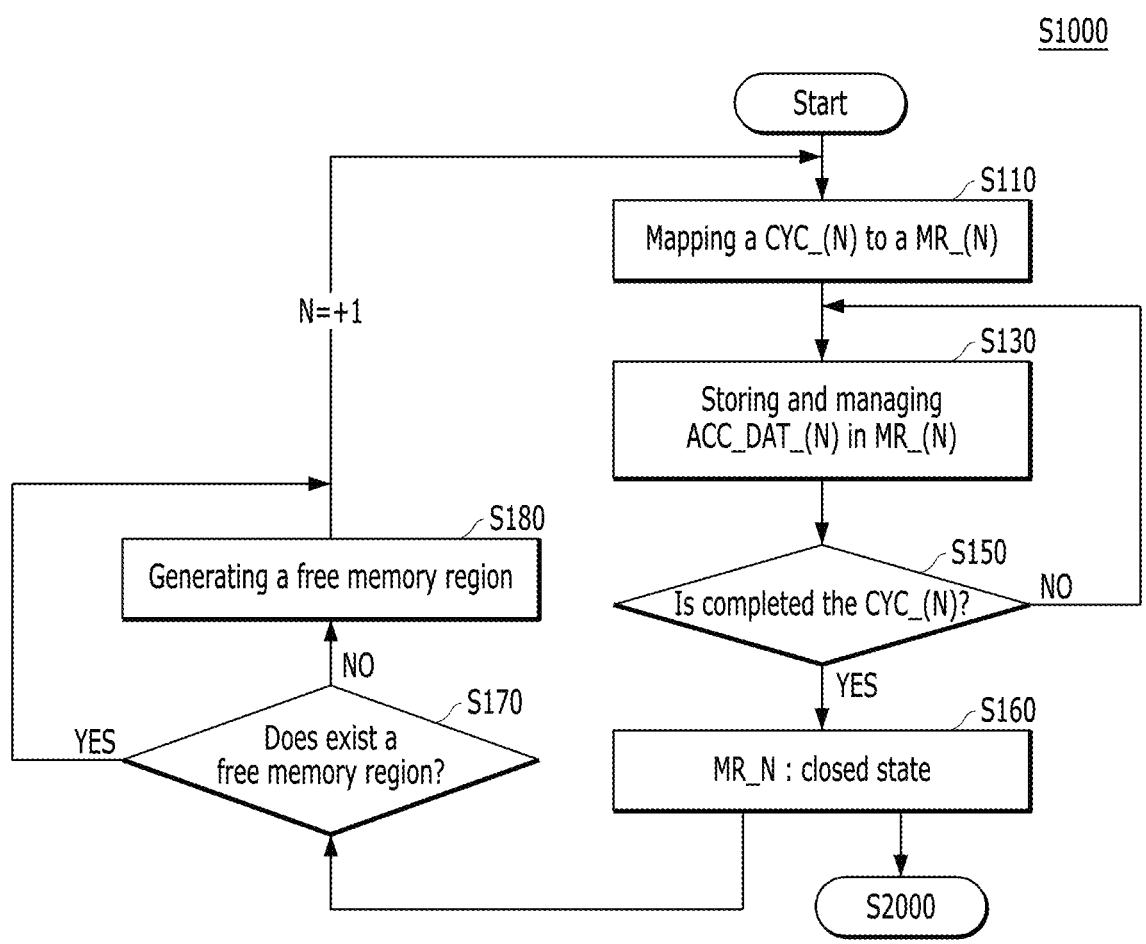
FIG. 6 is a flowchart for describing an access data management operation according to an embodiment of the present disclosure.

FIG. 6 is a flowchart for describing an access data management operation according to an embodiment of the present disclosure.

Specifically, FIG. 6 illustrates the access data management operation of S1000 in FIG. 5 in more detail.

In operation S110, the memory controller 130 maps the Nth cycle CYC_(N) to the Nth memory region MR_(N) that is a free memory region, where N is a natural number.

In operation S130, when a first access request is received from the host 102 after a start of the Nth cycle CYC_(N), the memory controller 130 may perform a management operation of the Nth access data ACC_DAT_(N). The management operation may include a setting operation, a maintaining operation, and an updating operation. For example, the memory controller 130 may set the Nth access data ACC_DAT_(N) to '1'.

In operation S150, the memory controller 130 may determine whether the Nth cycle CYC_(N) has completed.

If the determination in the operation S150 is that the Nth cycle CYC_(N) has not been completed ('NO' in the operation S150), the memory controller 130 may manage access data based on whether a second access request is received by returning to the operation S130.

In the operation S130, in a state in which the Nth access data ACC_DAT_(N) is being managed as bit data BIT and if the second access request is received, the memory controller 130 may maintain the Nth access data ACC_DAT_(N) as '1'. In a state in which the Nth access data ACC_DAT_(N) is being managed as count data COUNT and if the second access request is received, the memory controller 130 may update the Nth access data ACC_DAT_(N) from '1' to '2'.

In operation S160, as a result of the determination in S150, if the Nth cycle CYC_(N) has been completed ('YES' in the operation S150), the memory controller 130 determines the Nth memory region MR_(N) as a closed state. Accordingly, the memory controller 130 no longer manages the Nth access data ACC_DAT_(N) stored in the Nth memory region MR_N.

After the operation S160, the memory controller 130 returns to the operation S2000 in FIG. 5 and may perform the weight assignment operation. Further, as a result of the determination in S150, if the Nth cycle CYC_(N) has not been completed ('NO' in the operation S150), the memory controller 130 returns to the operation S130.

In operation S170, the memory controller 130 may determine whether a free memory region, in which an access data is not stored, exists in the memory region MR while the weight assignment operation of S2000 is performed. The operations S170 and the operation S2000 may be performed at the same time.

If the determination in the operation S170 is that the free memory region exists ('YES' in the operation S170), the memory controller 130 may map the N+1th cycle CYC_(N+1) to the free memory region by returning to the operation S110. The memory controller 130 may manage the N+1th access data ACC_DAT_(N+1) corresponding to the N+1th cycle CYC_(N+1) in the operation S130.

In operation S180, if there is no free memory region as a result of the determination in the operation S170 ('NO' in the operation S170), the memory controller 130 generates a free memory region by erasing the access data ACC_DAT stored in the memory region corresponding to the earliest cycle, among the memory regions MR_1, MR_2, and MR_3. Then, the memory controller 130 maps the N+1th cycle CYC_(N+1) to the free memory region generated by returning to the operation S110. The memory controller 130 may manage the N+1th access data ACC_DAT_(N+1) for the N+1th cycle CYC_(N+1) of the operation S130.

Figure 7A:
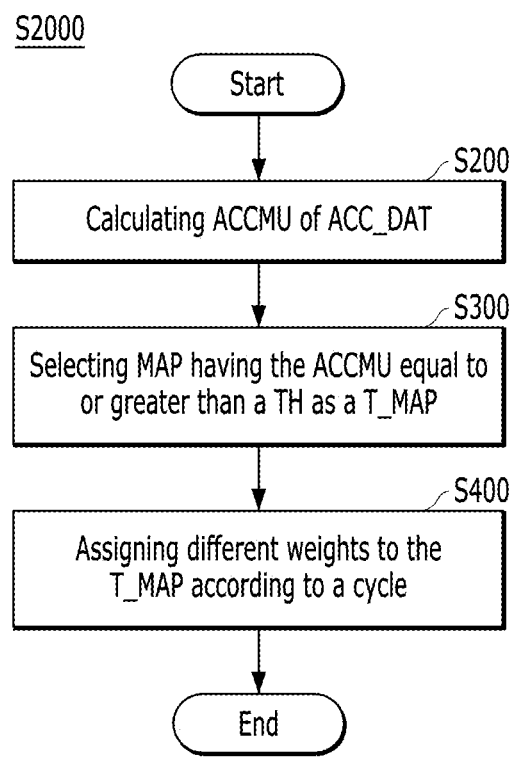
FIG. 7A and FIG. 7B are diagrams for describing a weight assignment operation according to an embodiment of the present disclosure.
Figure 7B:
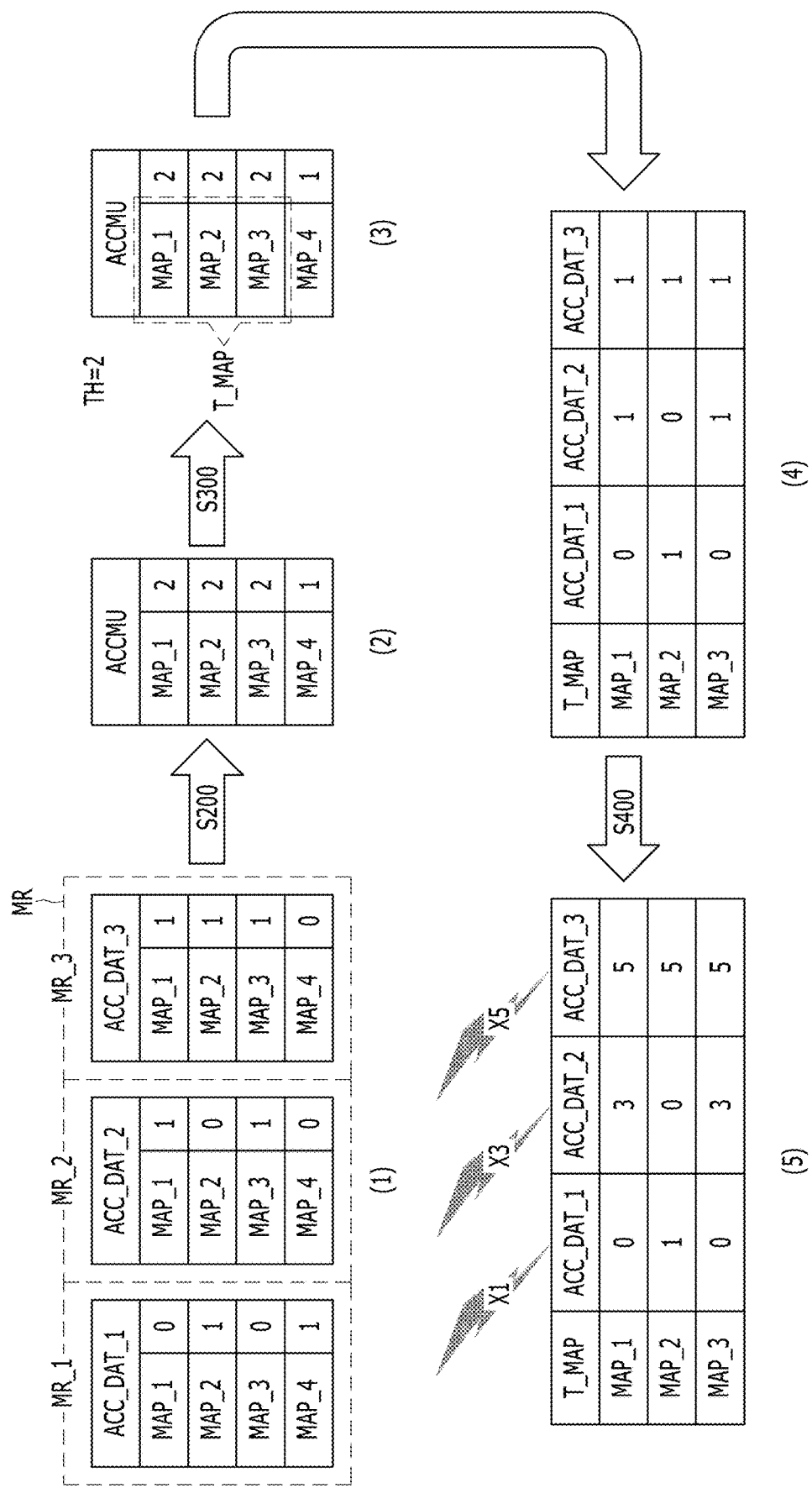

FIG. 7A and FIG. 7B are diagrams for describing a weight assignment operation according to an embodiment of the present disclosure.

Specifically, FIG. 7A is a flowchart for illustrating the weight assignment operation of S2000 in FIG. 5. FIG. 7B shows an example of the weight assignment operation described in FIG. 7A.

Referring to FIG. 7A, in operation S200, the memory controller 130 may accumulate all access data ACC_DAT to calculate the accumulation data ACCMU. The access data ACC_DAT may be stored in the memory region MR.

For example, as shown in (1) and (2) of FIG. 7B, the memory controller 130 accumulates the first to third access data ACC_DAT_1, ACC_DAT_2, and ACC_DAT_3 to calculate the accumulation data ACCMU when the third access data ACC_DAT_3 is stored after the completion of the third cycle CYC_3. The accumulation data ACCMU for the first to third map information MAP_1, MAP_2, and MAP_3 may be '2', respectively, and the accumulation data ACCMU for the fourth map information MAP_4 may be '1'.

In accordance with another embodiment of the present disclosure, the memory controller 130 may calculate only the accumulation data ACCMU of the map information MAP requested for access by the host 102 during the most recent cycle.

For example, the memory controller 130 may calculate the accumulation data ACCMU only for the first to third map information MAP_1, MAP_2, and MAP_3, requested for access by the host 102 during the most recent cycle CYC_3. Each value of the third access data ACC_DAT_3 for the first to third map information MAP_1, MAP_2, and MAP_3 may be '1' or greater. Since the fourth map information MAP_4 is not requested for access during the third cycle CYC_3, the memory controller 130 may not calculate the accumulation data of the fourth map information MAP_4. Since the memory controller 130, according to another embodiment of the present disclosure, does not calculate the accumulation data ACCMU for all map information MAP, thereby saving resources consumed by the memory controller 130.

The memory controller 130 may determine that map information MAP having accumulation data ACCMU equal to or greater than a threshold value TH exists, among the plurality of map information MAP_1, MAP_2, and MAP_3.

If there is no map information MAP having an accumulation data ACCMU equal to or greater than the threshold value TH, the memory controller 130 proceeds to store access data ACC_DAT corresponding to the next cycle by returning to the operation S1000 of FIG. 5.

In operation S300, the memory controller 130 may select the map information MAP having the accumulation data ACCMU equal to or greater than the threshold value TH, as the target map information T_MAP.

For example, as shown in (3) of FIG. 7B, the memory controller 130 selects the first to third map information MAP_1, MAP_2, and MAP_3 as the target map information T_MAP when the threshold value TH is set to '2'. The target map information may be map information that is continuously accessed by the host 102 during multiple cycles.

The memory controller 130 may perform an operation of selecting the target map information T_MAP each time the cycle is completed.

Additionally, the memory controller 130 may perform the operation of selecting the target map information T_MAP when the size of a free space included in the data structure of the access data ACC_DAT or the memory region MR is smaller than the size of the access data ACC_DAT corresponding to one cycle. When a storage space of the data structure is filled with the plurality of access data ACC_DAT, or the free space of a plurality of memory regions is filled with the plurality of access data ACC_DAT, the memory controller 130 may select the target map information T_MAP.

In operation S400, the memory controller 130 may assign different weights WEIGHT according to cycles to each of the first access data ACC_DAT_1, the second access data ACC_DAT_2, and the third access data ACC_DAT_3 of the target map information T_MAP.

For example, as shown in (4) and (5) of FIG. 7B, the first to third access data ACC_DAT_1, ACC_DAT_2, and ACC_DAT_3 of the plurality of the target map information MAP_1, MAP_2, and MAP3 may be assigned different weights X1, X3, and X5, respectively. At this time, a maximum weight WMAX of 'X5' is assigned to the third access data ACC_DAT_3 corresponding to the third cycle CYC_3, the most recent cycle. A medium weight WMID of 'X3' is assigned to the second access data ACC_DAT_2 corresponding to the second cycle CYC_2. The first access data ACC_DAT_1 corresponding to the first cycle CYC_1 may be assigned a minimum weight WMIN of 'X1'.

As such, the memory controller 130 according to the embodiment of the present disclosure does not assign weights to the access data ACC_DAT of all of the plurality of map information MAP_1, MAP_2, and MAP_3, but assigns weights to the target map information T_MAP, thereby saving resources of the memory controller 130.

In an embodiment of the present disclosure, the weight assignment operation of S2000 may be performed when new access data ACC_DAT is stored after the completion of the cycle, the data structure of access data ACC_DAT is full, or a free space of the memory region is insufficient.

Figure 8A:
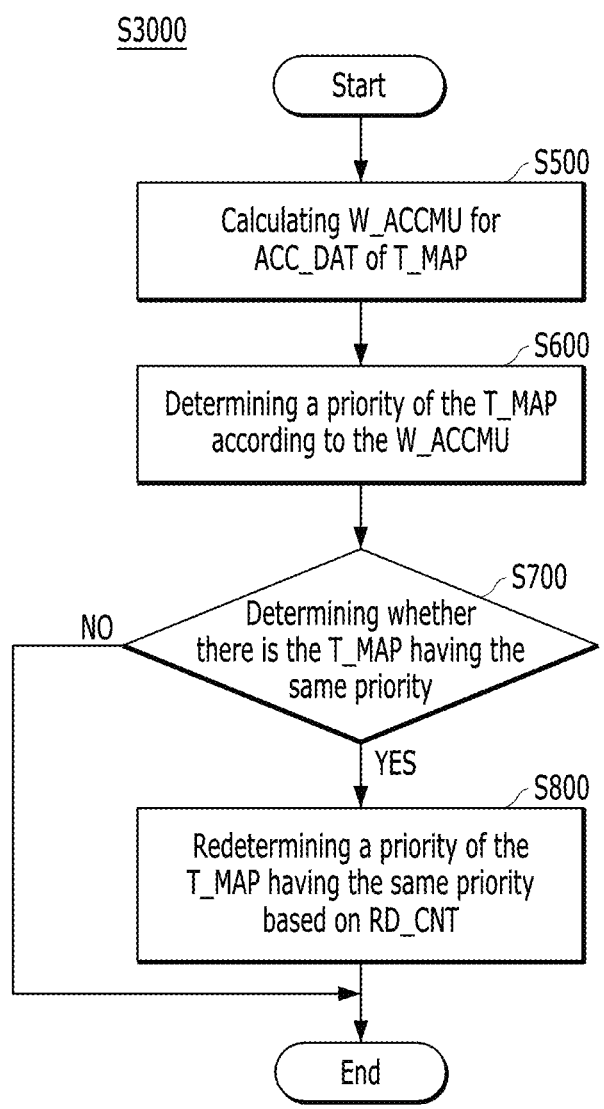
FIG. 8A and FIG. 8B are diagrams for describing a priority determination operation according to an embodiment of the present disclosure.
Figure 8B:
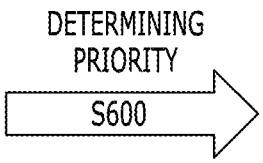
Figure 8B:
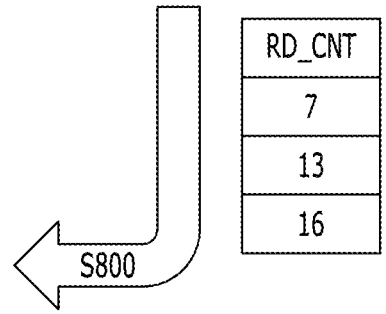

FIG. 8A and FIG. 8B are diagrams for describing a priority determination operation.

Specifically, FIG. 8A is a flowchart illustrating the priority determination operation of S3000 of determining the priority of map information based on the weight in FIG. 5. FIG. 8B shows an example of the priority determination operation described in FIG. 8A.

In operation S500 of FIG. 8A, the memory controller 130 may calculate weighted accumulation data W_ACCMU for the access data ACC_DAT to which different weights are assigned, of the target map information T_MAP.

For example, as shown in (1) of FIG. 8B, the memory controller 130 may calculate the weighted accumulation data W_ACCMU by accumulating the first to third access data ACC_DAT_1, ACC_DAT_2, and ACC_DAT_3, to which the weights are assigned as shown in (5) of FIG. 7B, of the target map information T_MAP.

In operation S600, the memory controller 130 may determine the priority of the target map information T_MAP according to the weighted accumulation data W_ACCMU.

For example, as shown in (2) of FIG. 8B, the memory controller 130 may determine the priorities of the first to third map information MAP_1, MAP_2, and MAP_3 of the target map information T_MAP as RANK 1, RANK 2, and RANK 1, respectively based on the weighted accumulation data W_ACCMU.

In operation S700, the memory controller 130 may determine target map information T_MAP having the same priority.

For example, as shown in (2) of FIG. 8B the priorities of the first map information MAP_1 and the third map information MAP_3 may have the same priority of RANK 1.

In operation S800, the memory controller 130 may re-determine the priority of the target map information T_MAP with the same priority based on the read count RD_CNT.

For example, as shown in (3) of FIG. 8B, since the read count RD_CNT of the first map information MAP_1 is '7' and the read count RD_CNT of the third map information MAP_3 is '16', the memory controller 130 may re-determine the priority of the third map information MAP_3 to be higher than the priority of the first map information MAP_1. Accordingly, the memory controller 130 may determine the priorities of the target map information T_MAP MAP_1, MAP_2, and MAP_3 as RANK 2, RANK 3, and RANK 1, respectively.

Referring again to (1) of FIG. 8B, the weighted accumulation data W_ACCMU of the first map information MAP_1 and the weighted accumulation data W_ACCMU of the third map information MAP_3 are the same at '8'. However, the read count RD_CNT of the first map information MAP_1 and the third map information MAP_3 are different at '7' and '16', respectively.

This means that both the first map information MAP_1 and the third map information MAP_3 are requested for access by the host 102 during the same cycle, but the first map information MAP_1 may have been requested less often than the third map information MAP_3.

In this way, according to an embodiment of the present disclosure, the memory controller 130 may prevent map information that is consistently accessed fewer times from being determined to have a higher priority than map information that is consistently accessed more times.

Although not shown in the figure, the present disclosure may include an embodiment of assigning different weights to the plurality of access data according to cycles before the operation S200 of FIG. 7A that calculates the accumulation data of the plurality of access data. The present disclosure may include an embodiment in which the target map information is selected using weighted access data.

The accumulation data of access data to which weight is assigned is greater than accumulation data of access data to which weight is not assigned. This means that accumulation data of weighted access data can more easily exceed the threshold value. Therefore, when the target map information is selected based on the accumulation data of weighted access data, the number of map information selected as the target map information can be increased.

As a result, the embodiment of the present invention may prevent a case where operation of transmitting map information to host 102 is delayed because target map information does not exist.

Figure 9:
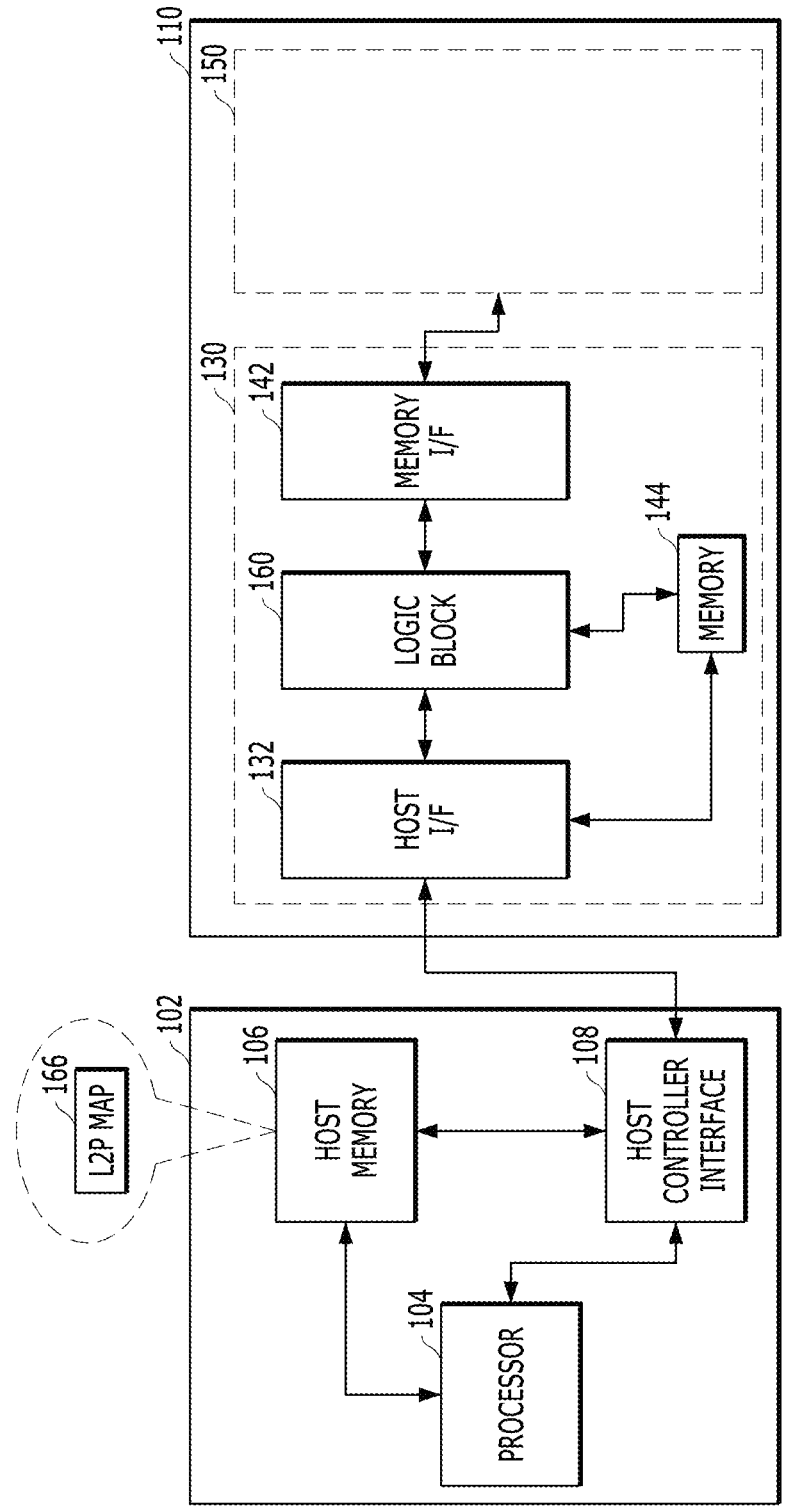
FIG. 9 a diagram for describing a configuration of a host and a memory system in a data processing system according to an embodiment of the present disclosure.
Figure 10:
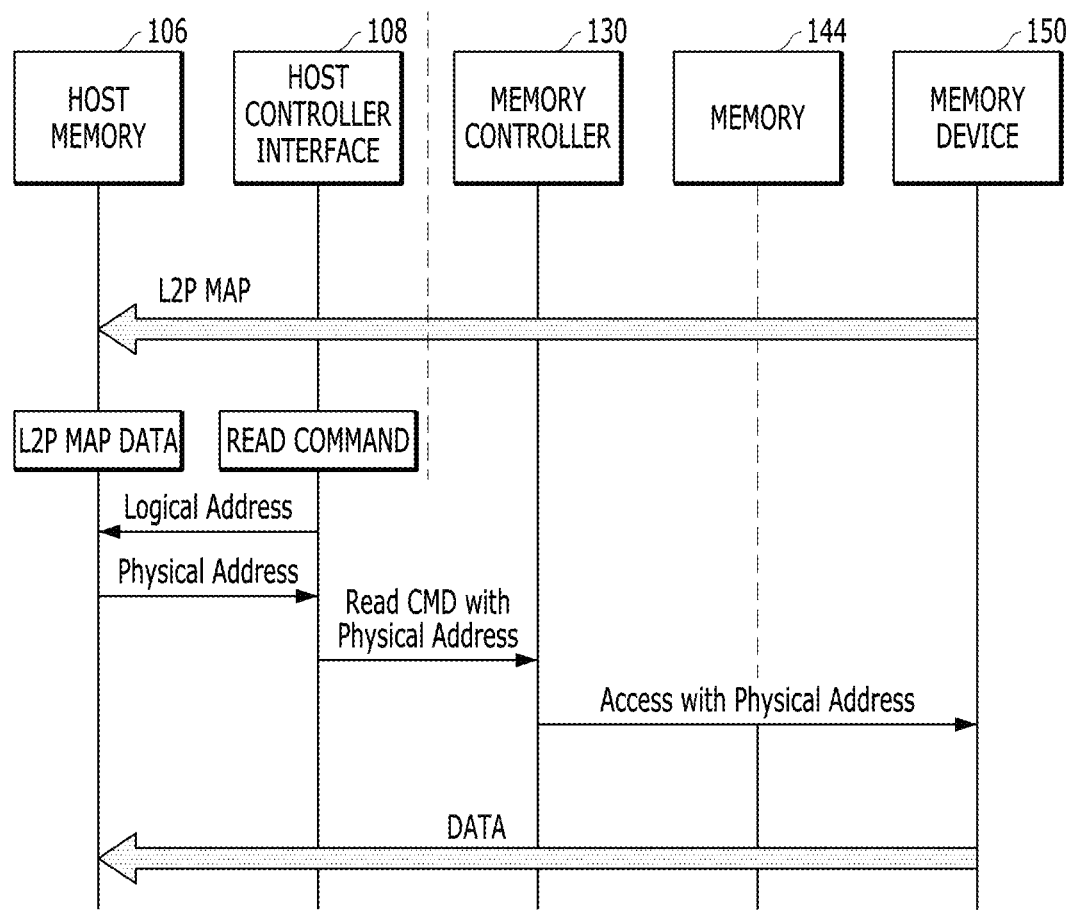
FIG. 10 a sequence diagram for describing a lead operation of a host and a memory system in a data processing system according to an embodiment of the present disclosure.

FIGS. 9 and 10 illustrate a configuration in which a portion of memory in a host is available for use as a cache device for storing map information used in the memory system.

Referring to FIG. 9, the host 102 may include a processor 104, a host memory 106, and a host controller interface 108. The memory system 110 may include a memory controller 130 and a memory device 150. Herein, the memory controller 130 and the memory device 150 described with reference to FIG. 9 may correspond to the previously-described memory controller 130 and memory device 150, respectively.

Accordingly, the memory controller 130 and the memory device 150 shown in FIG. 9 are described below primarily in terms of their respective technical differences with respect to the memory controller 130 and the memory device 150 shown in FIG. 1. Particularly, a logic block 160 in the memory controller 130 may correspond to the flash translation layer (FTL) 134 of FIG. 1. However, according to an embodiment, the logic block 160 in the memory controller 130 may perform an additional function as compared to the flash translation layer (FTL) 134 of FIG. 1. Further, a host interface (I/F) 132 and a memory interface (I/F) 142 correspond to the host interface 131 and the memory interface 138, respectively.

The host 102 may include the processor 104, which has a higher performance than that of the memory system 110, and the host memory 106 which is capable of storing a larger amount of data than that of the memory system 110 and which cooperates with the host 102. The processor 104 and the host memory 106 in the host 102 can have an advantage over their respective counterparts in the memory system 110 in terms of space and upgradability. For example, the processor 104 and the host memory 106 can have less of a space limitation than the processor 134 and the memory 144 in the memory system 110. The processor 104 and the host memory 106 can be replaceable for upgrading their performance, which is distinguishable from the processor 134 and the memory 144 in the memory system 110. In an embodiment, the memory system 110 can utilize the resources possessed by the host 102 in order to increase operation efficiency of the memory system 110.

As an amount of data which can be stored in the memory system 110 increases, an amount of associated map information stored in the memory system 110 also increases. When storage capability used to load the map information in the memory 144 of the memory controller 130 is limited or restricted, the increase in an amount of loaded map information may cause an operational burden on operations of the memory controller 130. For example, because of a limitation of space or region allocated for map information in the memory 144 of the memory controller 130, some, but not all, of the map information may be loaded. If the loaded map information does not include specific map information for a physical location to which the host 102 intends to access, the memory controller 130 stores the loaded map information back in the memory device 150 if some of the loaded map information has been updated, as well as loads the specific map information for the physical location to which the host 102 intends to access. These operations should be performed for the memory controller 130 to perform a read operation or a write operation instructed by the host 102, and may degrade performance of the memory system 110.

Storage capability of the host memory 106 in the host 102 may be tens or hundreds of times larger than that of the memory 144 in the memory controller 130. The memory system 110 may transfer map information (L2P MAP) 166 used by the memory controller 130 to the host memory 106 in the host 102 so that at least a portion of the host memory 106 in the host 102 may be accessed by the memory system 110. The accessible portion of the host memory 106 may serve as a cache memory for address translation for reading or writing data in the memory system 110. In this case, the host 102 translates a logical address into a physical address based on the map information 166 stored in the host memory 106 before transmitting the logical address along with a request, a command, or an instruction to the memory system 110. Then, the host 102 can transmit the translated physical address with the request, the command, or the instruction to the memory system 110. The memory system 110, which receives the translated physical address with the request, the command, or the instruction, may skip an internal process of translating the logical address into the physical address and access the memory device 150 based on the physical address transferred. In this case, overhead (e.g., operational burden) of the memory controller 130 loading map information from the memory device 150 for the address translation may be reduced or eliminated, and operational efficiency of the memory system 110 can be enhanced.

On the other hand, even if the memory system 110 transmits the map information 166 to the host 102, the memory system 110 can control mapping information that is a reference of the map information 166 such as map information generation, erase, update, and the like. The map information 166 uploaded to the host 102 may be at least some of the map information stored in the memory device 150. The mapping information stored in the memory system 110 may be updated as a result of an operation of the memory device 150. In an embodiment, the map information 166 may be updated due to update of the map information stored in the memory device 150. The memory controller 130 in the memory system 110 may perform a background operation such as garbage collection and wear leveling according to an operation state of the memory device 150 and may determine a physical address, i.e., which physical location in the memory device 150 data transferred from the host 102 is to be stored. Since a physical address of data stored in the memory device 150 may be changed and the host 102 has not recognized the changed physical address, the memory system 110 may, on its own initiative, control the map information 166 based on the map information stored in the memory system 110.

While the memory system 110 controls map information used for the address translation, it can be determined that the memory system 110 needs to modify or update the map information 166 previously transmitted to the host 102. The memory system 110 can send a signal or map information to the host 102 to request the update of the map information 166 stored in the host 102. The host 102 may update the stored map information 166 in the host memory 106 in response to a request delivered from the memory system 110. This allows the map information 166 stored in the host memory 106 in the host 102 to be kept as the latest version such that, even though the host controller interface 108 uses the map information 166 stored in the host memory 106, there is no problem in translating a logical address into a physical address and transmitting the translated physical address along with the logical address to the memory system 110.

The map information 166 stored in the host memory 106 may include mapping information used for translating a logical address into a physical address. Referring to FIG. 9, map information associating a logical address with a physical address may include two distinct items: first mapping information used for translating a logical address into a physical address; and second mapping information used for translating a physical address into a logical address. Among them, the map information 166 stored in the host memory 106 may include the first mapping information. The second mapping information can be primarily used for internal operations of the memory system 110, but might not be used for operations requested by the host 102 to store data in the memory system 110 or read data corresponding to a logical address from the memory system 110. Depending on an embodiment, the second mapping information might not be transmitted by the memory system 110 to the host 102.

The memory controller 130 in the memory system 110 can control (e.g., create, delete, update, etc.) the first mapping information or the second mapping information, and store either in the memory device 150. Since the host memory 106 in the host 102 is a type of volatile memory, the map information 166 stored in the host memory 106 may disappear when an event such as interruption of power supply to the host 102 and the memory system 110 occurs. Accordingly, the memory controller 130 in the memory system 110 might not only keep the latest state of the map information 166 stored in the host memory 106 of the host 102, but also store the latest state of the first mapping information or the second mapping information in the memory device 150.

Referring to FIGS. 9 and 10, an operation requested by the host 102 to read data stored in the memory system 110 is described when the map information 166 is stored in the host memory 106 of the host 102.

Power is supplied to the host 102 and the memory system 110, and then the host 102 and the memory system 110 operably engage. When the host 102 and the memory system 110 cooperate, the map information (L2P MAP) stored in the memory device 150 can be transferred to the host memory 106.

When a read request (Read REQ) is issued by the processor 104 in the host 102, the read request is transmitted to the host controller interface 108. After receiving the read request, the host controller interface 108 searches for a physical address corresponding to a logical address corresponding to the read request in the map information (L2P MAP) stored in the host memory 106. Based on the map information (L2P MAP) stored in the host memory 106, the host controller interface 108 can recognize the physical address corresponding to the logical address. The host controller interface 108 carries out an address translation for the logical address associated with the read request.

The host controller interface 108 transfers the read request (Read REQ) with the logical address as well as the physical address to the controller 130 of the memory system 110. The controller 130 can access the memory device 150 based on the physical address received with the read request. Data stored at a location corresponding to the physical address in the memory device 150 can be transferred to the host memory 106 in response to the read request (Read REQ).

An operation of reading data stored in the memory device 150 including a nonvolatile memory may take more time than an operation of reading data stored in the host memory 106 or the like which is a volatile memory. In the above-described operation for handling the read request (Read REQ), the memory controller 130 may skip or omit an address translation corresponding to the logical address received from the host 102 (e.g., searching for and recognizing a physical address associated with the logical address). For example, in the address translation, the memory controller 130 might not have to load map information from the memory device 150 or replace the map information stored in the memory 144 when the memory controller 130 cannot find map information for the address translation in the memory 144. This allows the memory system 110 to perform a read operation requested by the host 102 more quickly.

Although the detailed embodiments have been described in the detailed description of the present disclosure, the present disclosure may be modified in various ways without departing from the scope of the present disclosure. Accordingly, the scope of the present disclosure should not be limited to the aforementioned embodiments, but should be defined by not only the claims, but equivalents thereof.

Moreover, the embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A memory system comprising:
a memory device configured to store data; and
a memory controller configured to:
generate a plurality of pieces of access data corresponding to a plurality of pieces of map information respectively for each of a plurality of cycles, wherein the plurality of pieces of access data indicate a number of times of the map information have been accessed by a host, among the plurality of pieces of map information;
select at least one target map information in which accumulation data of the plurality of pieces of access data is greater than or equal to a threshold value, among the plurality of pieces of map information, and assign different weights to the plurality of pieces of access data corresponding to the target map information according to the each of the plurality of cycles; and
determine a priority of the target map information based on weighted accumulation data calculated by accumulating the plurality of pieces of access data assigned weights corresponding to the target map information to select at least one target map information that has been consistently requested by the host over several recent cycles;
transmit at least one map information to the host based on the priority of the target map information,
wherein the memory controller is configured to re-determine the priority of the target map information having a same priority based on a read count for the plurality of pieces of map information,
wherein the read count is a cumulative number of access requests received from the host since power was supplied to the memory controller, and
wherein the same priority is determined based on the weighted accumulation data.

2. The memory system of claim 1, wherein the plurality of pieces of map information include inactive map information not stored in the host, and dirty map information whose physical address has been changed among active map information stored in the host.

3. The memory system of claim 1, wherein the memory controller is configured to control the plurality of pieces of access data to be managed in a first-in-first-out (FIFO) manner.

4. The memory system of claim 1, wherein the memory controller is configured to store the plurality of pieces of access data each time a cycle is completed.

5. The memory system of claim 1, wherein the memory controller is configured to perform an operation of selecting the target map information each time a cycle is completed.

6. The memory system of claim 1, wherein the memory controller is configured to perform an operation of selecting at least one target map information each time a storage space is filled with the plurality of pieces of access data,
wherein the target map information includes map information in which accumulation data of the plurality of pieces of access data is greater than or equal to a threshold value.

7. The memory system of claim 1, wherein a value of the plural pieces of access data for the each cycle starts generating from '0'.

8. A memory controller comprising:
a plurality of memory regions configured to include a Nth memory region for storing a Nth access data for plural pieces of map information, corresponding to a Nth cycle, where N is a natural number;
a flash translation layer configured to
generate plural pieces of access data corresponding to plural pieces of map information respectively for each of a plurality of cycles, wherein the plural pieces of access data indicate a number of times of map information have been accessed by a host, among the plural pieces of map information;
select at least one target map information in which accumulation data of the plural pieces of access data stored in the plurality of memory regions is greater than or equal to a threshold value, among the plural pieces of map information, and
assign different weights to the plural pieces of access data corresponding to the target map information according to the each cycle, to determine a priority of the target map information when the Nth cycle is completed; and
a host interface configured to transmit the target map information that has been consistently requested by the host over several recent cycles to a host based on the priority,
wherein the flash translation layer is configured to determine a priority of the target map information based on weighted accumulation data calculated by accumulating the plural pieces of access data assigned weights corresponding to the target map information,
wherein the flash translation layer is configured to re-determine the priority of the target map information having a same priority based on a read count for the plural pieces of map information,
wherein the read count is a cumulative number of access requests received from the host since power was supplied to the memory controller, and
wherein the same priority is determined based on the weighted accumulation data.

9. The memory controller of claim 8, wherein the different weights have a value based on a cycle.

10. The memory controller of claim 8, wherein the flash translation layer is configured to assign a first weight to the Nth access data, and a second weight lower than the first weight to a N-1th access data corresponding to a N-1th cycle which is a previous cycle of the Nth cycle.

11. The memory controller of claim 8, wherein the plural pieces of map information includes inactive map information not stored in the host, and dirty map information whose physical address has been changed among active map information stored in the host.

12. The memory controller of claim 8, wherein the flash translation layer is configured to control the plural pieces of access data to be managed in a first-in-first-out (FIFO) manner.

13. The memory controller of claim 8, wherein the flash translation layer is configured to perform an operation of selecting the target map information each time the cycle is completed.

14. The memory controller of claim 8, wherein the flash translation layer selects the target map information each time a storage space is filled with the plural pieces of access data.

15. The memory controller of claim 8, wherein a value of the plural pieces of access data for the each cycle starts generating from '0'.

* * * * *